United States Patent
Kalkman et al.

[11] Patent Number: 5,810,421
[45] Date of Patent: Sep. 22, 1998

[54] MULTIPLE FUNCTION VISOR

[75] Inventors: Jesse Kalkman; Corbin L. Collet, both of Holland, Mich.

[73] Assignee: Prince Corporation, Holland, Mich.

[21] Appl. No.: 714,641

[22] Filed: Sep. 16, 1996

[51] Int. Cl.⁶ .................................................. B60J 3/02
[52] U.S. Cl. ..................... 296/97.5; 296/97.6; 296/97.11
[58] Field of Search ..................... 276/97.1, 97.5, 276/97.6, 97.11–97.13

[56] References Cited

U.S. PATENT DOCUMENTS

| | | | |
|---|---|---|---|
| 2,238,981 | 4/1941 | Newell | 296/97.8 |
| 2,252,716 | 8/1941 | Levy | 296/97.8 X |
| 2,667,222 | 1/1954 | McCarthy et al. | 296/97.8 X |
| 2,948,566 | 8/1960 | Massey | 296/97.8 |
| 2,978,274 | 4/1961 | Ordman . | |
| 3,244,447 | 4/1966 | Whitaker . | |
| 3,692,355 | 9/1972 | Hong | 160/DIG. 3 X |
| 3,825,296 | 7/1974 | Peterson . | |
| 4,500,131 | 2/1985 | Fleming . | |
| 4,521,047 | 6/1985 | Saxman . | |
| 4,623,188 | 11/1986 | Juraschek et al. . | |
| 4,858,982 | 8/1989 | Dykstra et al. | 296/97.5 |
| 4,919,468 | 4/1990 | Abu-Shumays et al. | 296/97.4 |
| 4,971,381 | 11/1990 | Abu-Shumays et al. | 296/97.9 |
| 5,005,895 | 4/1991 | Muyres et al. | 296/97.8 |
| 5,044,685 | 9/1991 | Yang | 296/97.6 |
| 5,156,434 | 10/1992 | Vandagriff | 296/97.12 X |
| 5,244,244 | 9/1993 | Gutg et al. | 296/97.9 X |
| 5,409,285 | 4/1995 | Snyder et al. | 296/97.11 |
| 5,479,155 | 12/1995 | Zeinstra et al. | 340/825.22 |
| 5,577,792 | 11/1996 | Muyres et al. | 296/97.9 |

FOREIGN PATENT DOCUMENTS

| | | | |
|---|---|---|---|
| 1275252 | 9/1961 | France | 296/97.9 |
| 1503851 | 12/1967 | France | 296/97.6 |
| 2932102 | 2/1981 | Germany | 296/97.9 |
| 764955 | 1/1957 | United Kingdom | 296/97.8 |

*Primary Examiner*—Dennis H. Pedder
*Attorney, Agent, or Firm*—Price, Heneveld, Cooper, DeWitt & Litton

[57] ABSTRACT

A visor system includes a pair of opposed, facing visor panels, each of which are pivotally mounted to a vehicle roof by a pivot rod assembly in opposed, facing relationship. The length of the visor panels is selected to be substantially less than typical visor panels such that they intersect at a junction approximately midway between the visor mounting brackets. Each of the visor panels can be moved independently for front and side window protection and include interlocking means such that, if desired, they can function as a single visor. In one embodiment of the invention, at least one of the visor panels is slideably moved along the pivot rod.

9 Claims, 3 Drawing Sheets

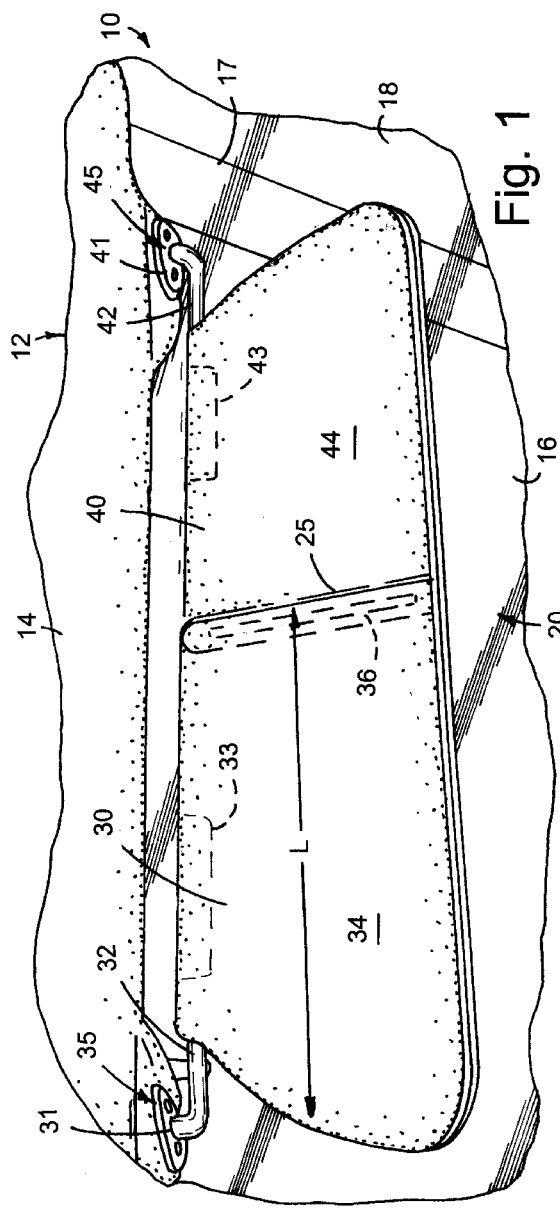
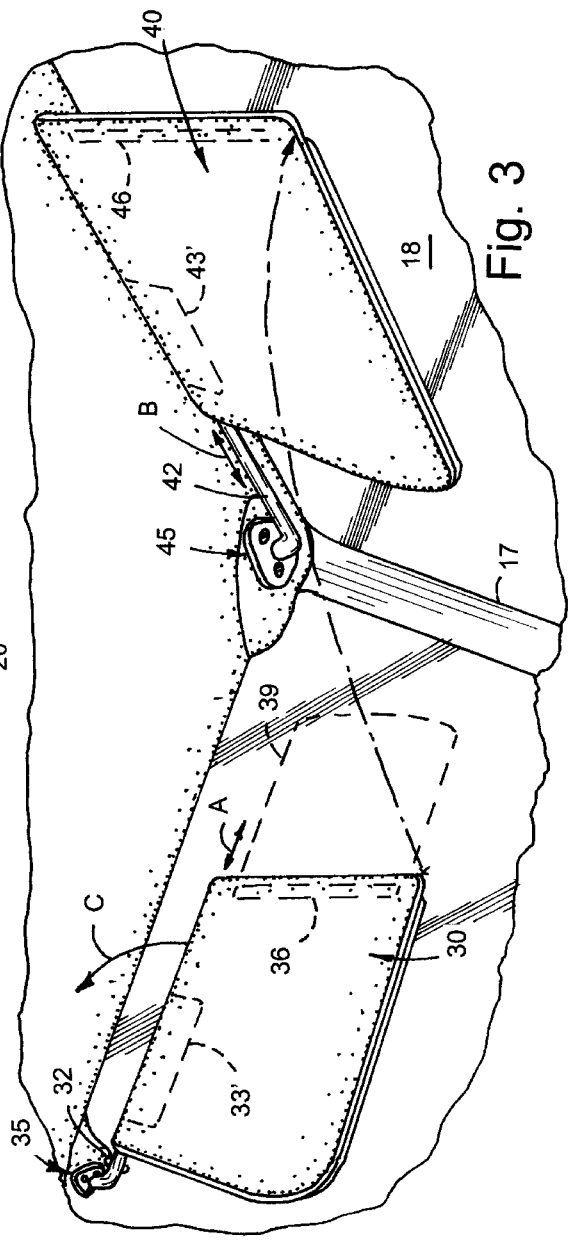

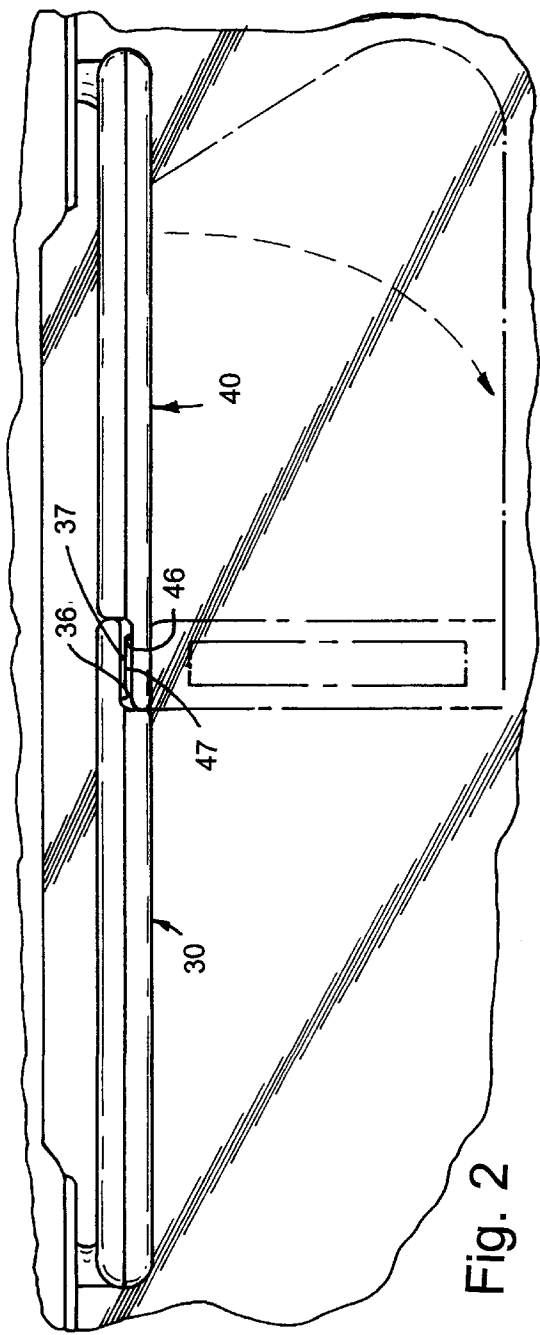
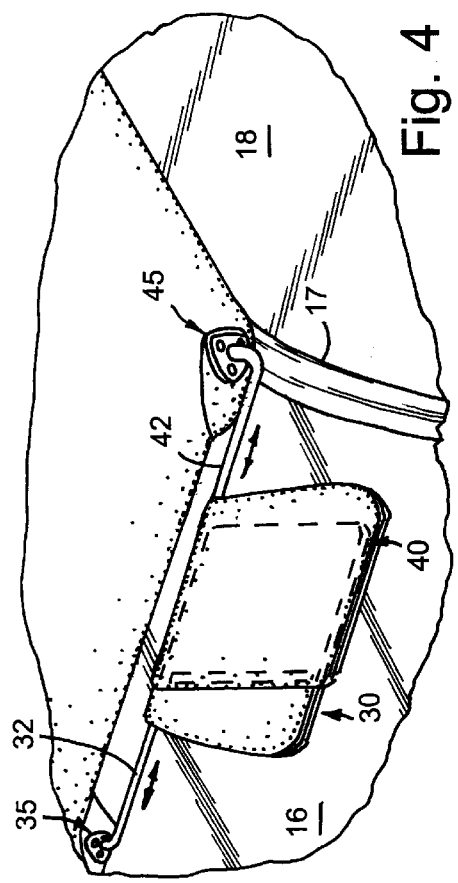

MULTIPLE FUNCTION VISOR

BACKGROUND OF THE INVENTION

The present invention relates to vehicle visors and particularly visors adapted for multiple sun-blocking positions.

There have been proposals for a wide variety of visors including multiple panels which can adjust for front and side window sun-blocking positions. One such proposal is represented by U.S. Pat. No. 4,858,982, which discloses overlying nested visor panels which afford front windshield and side window sun-blocking protection as well as providing an illuminated vanity mirror. Although the thickness of such a visor tends to be increased, the utilization of polycarbonate thin panels provides such a nested visor system and yet retains a relatively thin profile. Nonetheless, it is preferable in some vehicles to provide an upholstered visor and one which is somewhat easier to use since a sequence of synchronized visor movements is generally necessary with the multiple panel visors of the prior art.

SUMMARY OF THE PRESENT INVENTION

The visor system of the present invention provides the desired flexibility of a multiple visor installation and yet the appearance of a thin functional single visor panel when in one of its various operational positions. The visor system of the present invention accomplishes this objective by providing a pair of opposed, facing visor panels, each of which are pivotally mounted to the vehicle roof by a pivot rod assembly in opposed, facing relationship. The length of the visor is selected to be substantially less than that of existing visor panels such that they intersect at a junction approximately midway between the pivot rod mounting brackets. Each of the visor panels can thus be moved independently for front and side window protection. In a preferred embodiment, they include interlocking means such that, if desired, they function as a single visor.

In other embodiments of the invention, at least one of the visor panels is slideably moved along the pivot rod in order to provide even greater adjustment of the visors. In other embodiments of the invention also, at least one of the visor panels includes a separate slide-out panel allowing one of the visor panels to achieve substantially full-width visor protection. These and other features, objects and advantages of the present invention will become apparent upon reading the following description thereof together with reference to the accompanying drawings.

BRIEF DESCRIPTION OF THE DRAWINGS

FIG. 1 is a fragmentary perspective view of a vehicle including a visor installation of the present invention shown with the visor assembly in a partially lowered position;

FIG. 2 is a front elevational view of the visor shown in FIG. 1, shown in a raised stored position;

FIG. 3 is a fragmentary perspective view of the visor system shown in FIGS. 1 and 2, showing the visors moved from their overlapping position to individually operable positions;

FIG. 4 is a fragmentary perspective view of the visor system of the present invention shown in another adjusted position;

DETAILED DESCRIPTION OF THE PREFERRED EMBODIMENT

Figure 5:
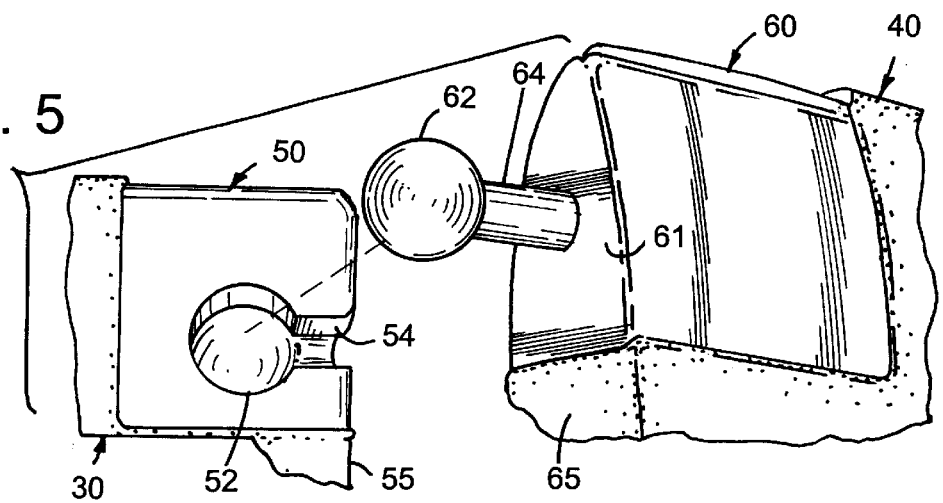
FIG. 5 is an enlarged fragmentary perspective view of alternative structure for interlocking individual visor panels of the visor system of the present invention.

Referring initially to FIGS. 1 and 2, there is shown a vehicle 10, such as an automobile, having a roof 12 typically covered by an integrally molded headliner 14 having a fabric covering and acoustical dampening properties for providing a trim and quite interior to the vehicle. The vehicle includes a front windshield 16 and, as shown in FIGS. 1 and 2, a passenger side visor installation in which there is shown also an A-pillar 17 extending between the windshield 16 and the side window 18 of the vehicle. The visor system 20 of the present invention is shown mounted on the passenger side of the vehicle 10, although as can be appreciated, a similar substantially identical visor assembly can be mounted on the driver's side.

The visor system 20 of the present invention is uniquely characterized in that it includes a first visor panel 30 and a second visor panel 40, both of which have a substantially reduced length along their longitudinal axes and which interlock along the junction 25 of the visors 30 and 40 to provide the appearance of an integrated, single visor when shown in the operational position of FIGS. 1 and 2. For such purpose, each of the visor panels 30 and 40 include their own pivot rod bracket assemblies 35 and 45, which can be of substantially conventional construction with a mounting bracket 31 and 41, respectively, for attachment of an L-shaped pivot rod 32 and 42 to the roof 12 of the vehicle utilizing suitable fasteners in a conventional manner. The construction of the pivot rod mounting bracket assemblies 35 and 45 can be substantially as shown in U.S. Pat. No. 4,500,131 with the elongated visor pivot rod 32 and 42 extending within the bodies of the visor panels 30 and 40 and mounted to a visor core therein utilizing a torque control 33 and 43, respectively, of the construction disclosed in the '131 patent, the disclosure of which is incorporated herein by reference. Each of the visor panels 30 and 40 includes a core of either molded polypropylene material or molded fiberboard covered by a suitable upholstery material 34 and 44, respectively, to conform the visor panels to the interior of the vehicle.

In the embodiments shown in FIGS. 1–4, the visor panels 30 and 40 have a substantially reduced length "L" (FIG. 1) along their longitudinal axes as compared to regular-sized visors and include an overlapping section at approximately the midpoint of the combined visors width provided by panels 30 and 40 at junction 25. The length "L" of each of the visor panels 30 and 40 is significantly less than the length of a normal visor and covers approximately one quarter of the overall length of the windshield 16, such that the two visor panels 30 and 40 when coupled together, as seen in FIGS. 1 and 2, substantially covers one side of the windshield. As best seen in FIG. 2 for such purpose, each of the visor panels 30 and 40 include a step-cut or recess 36 and 46, respectively, extending through approximately half of the thickness of the visors to allow the visors to nest and be interlocked to one another utilizing interlocking fasteners 37 and 47 mounted in the walls of the facing recesses 36 and 46, respectively. Fasteners 37 and 47 can take on a variety of forms such as magnetic strips for attracting and holding the visor panels 30 and 40 together, hook-and-loop-type fasteners, mating snaps or other fasteners which will allow the visor panels to be intercoupled and move as a unit, as shown in FIGS. 1 and 2, or be separated for individual adjustment movement, as described below. The overall length of the visor installation 20 is approximately "2L" which can substantially fill the area between A-pillar 17 and the center of windshield 16 for each of the passenger and driver sides of the vehicle. The panels can be separated by lowering the visor into the position shown in FIG. 3 and visor panel 40 moved to the side window sun-blocking position, as illustrated in FIG. 3, while the second visor 30 remains in the front window position.

In one embodiment of the present invention, the visor panels 30 and 40 are mounted in sliding relationship to their pivot rods 32 and 42 utilizing a torque fitting 33' and 43', respectively, which can be of the type disclosed in U.S. Pat. No. 5,409,285, the disclosure of which is incorporated herein by reference. This allows each of the visor panels 30 and 40 to be moved to a lowered sun-blocking position, as illustrated in FIG. 3, and also along the longitudinal axis of the pivot rods 32 and 42, as illustrated by arrows A and B, respectively, to desired sun-blocking positions. Although each of the panels 30 and 40 are smaller than the normal visor panel width, the panels remain of significant size and, with their individual adjustability, allow the visors to provide significant and efficient sun-blocking protection, particularly when slideably moveable along their respective pivot rods. Additionally, and if desired, as illustrated in FIG. 3, at least one of the visor panels, such as panel 30, may include an auxiliary slide-out polymeric panel 39 which fits within a pocket formed within the core of visor panel 30 to increase the sun-blocking protection of the visor panel. A visor with such a sliding panel is disclosed in, for example, U.S. Pat. No. 5,005,895. Visor panel 40 may also include such an auxiliary slide-out panel, if desired.

Visor 30 can also uniquely be rotated in a counterclockwise direction, as seen in FIG. 5 by arrow C, to provide protection from light impinging on the passenger's left side, while visor 40 is rotated to the front windshield position. Thus, the multiple opposed visor panels of the visor system of the present invention allows for both left, front and right side protection for both the driver and passenger when two such installations are employed.

An alternative manner by which the visors can be intercoupled for holding them in a unitary visor position, as seen in FIGS. 1, 2, is illustrated in the fragmentary perspective view of FIG. 5. In FIG. 5, visor panel 30 includes at its upper right corner, as viewed in FIGS. 1 and 3, a molded polymeric fitting 50 having a generally hemispherical socket 52 formed therein and a channel 54 leading from the edge of fitting 50 to socket 52. Visor 40, on the other hand, includes at its upper left corner an interlocking member 60 comprising a post 64 with a spherical ball 62 extending in spaced relationship from end wall 61 of member 60 such that ball 62 can snap in hemispherical socket 52 and be releasably held therein for interlocking the visor panels together. The visors can be overlapping, as seen in FIGS. 1–3, or have separate abutting ends 55 and 65, respectively, so that not only may the visors be individually moved, as shown in FIG. 3, or moved as a unit, as shown in FIGS. 1 and 2, but can be individually pivoted around ball and socket 62, 52 to a lowered use position, while the remaining visor panel remains in a raised stored position. The visors can still be raised and lowered as a single visor panel by gripping the lower edges of the visor remote from the ball and socket interlocking connection shown in FIG. 5.

FIG. 4 illustrates another feature of the visor installation of the system of the present invention by which visor panels 30 and 40, once decoupled from each other, can be moved toward the center of the windshield in overlapped relationship to provide a smaller center visor permitting greater visibility in the area near A-pillar 17 and the front center of the windshield when sun-blocking in these areas is unnecessary.

Figure 6:
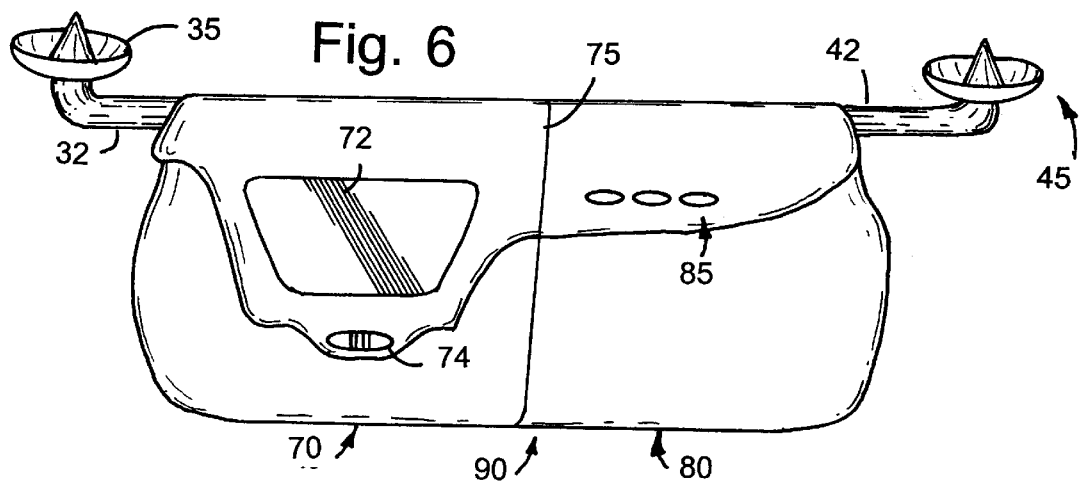
FIG. 6 is a fragmentary perspective view of a visor system embodying the present invention shown with additional features thereon.

FIG. 6 is a fragmentary perspective view of the visor system which can have visor panels 70 and 80, respectively, of substantially the same construction as panels 30 and 40 in FIGS. 1–4 and similar mounting bracket assemblies 35 and 45. Visor panels 70 and 80, however, include additional accessories with panel 70, for example, including a vanity mirror 72 mounted therein with a source of illumination 74 for use of the vanity mirror in low ambient light conditions. Visor panel 80 may include a HomeLink® trainable garage door opening transmitter 85 mounted to the upper edge when the visor installation 90, shown in FIG. 6, is installed on the driver's side of the vehicle. The HomeLink® trainable transmitter is described in U.S. Pat. No. 5,479,155 and allows the visor installation with such a transmitter to train to three different garage door actuated mechanisms. Visors 70 and 80 are intercoupled at junction 75 in the same manner as disclosed in FIGS. 1–4 or FIG. 5 and can be slideably moved along the pivot rods 32 and 42 to provide the same adjustability as described in the earlier embodiments.

Thus, by providing opposed, facing and interlocking visor panels independently moveable on independent pivot bracket assemblies, a relatively thin, substantially infinitely adjustable visor system can be provided for providing front windshield, side window and enter vehicle sun-blocking positions of a variety of widths and selected adjustable positions.

It will become apparent to those skilled in the art that various modifications to the referred embodiments of the invention as described herein can be made without departing from the spirit or scope of the invention as defined by the appended claims.

The embodiments of the invention in which an exclusive property or privilege is claimed are defined as follows:

1. A visor assembly comprising:

first and second visor panels;

a first mounting bracket coupled to one end of said first visor panel for mounting said first visor panel to a vehicle roof for movement between a raised stored position and at least a first lowered position; and a second mounting bracket coupled to one end of said second visor panel for mounting said second visor panel to a vehicle roof for movement between a raised stored position and at least a first lowered use position independently of said first visor panel, wherein said first and second visor panels each have a second end remote from said one end and said first and second panels have a length in a longitudinal direction selected such that said second end of said first and second visor panels are in aligned end-abutting relationship and their lengths together substantially extend between said first and second mounting brackets when said first and second visors are in a first lowered use position extending along the windshield of a vehicle, and wherein at least one of said visor panels is movable when in said first use position in a direction orthogonal to the other visor panel to a side window position and wherein each of said visor panels include ends which have recesses extending in the planar surfaces thereof for overlapping an end of the adjacent visor panel.

2. The visor assembly as defined in claim 1 wherein said overlapping ends of said visor panels include interlocking means for holding said adjacent ends of said visor panels together and allowing the visors to be separated.

3. The visor assembly as defined in claim 2 wherein said interlocking means comprises magnetic strips.

4. The visor assembly as defined in claim 2 wherein said interlocking means comprises hook-and-loop fasteners.

5. The visor assembly as defined in claim 2 wherein said interlocking means comprises snaps.

6. A visor assembly comprising:

first and second visor panels, each having a length permitting the visor panels to be mounted in longitudinally aligned end-to-end relationship which when so aligned substantially cover one side of a vehicle windshield;

a pair of spaced-apart mounting brackets for mounting said first and second visor panels in said end-to-end relationship wherein one of said brackets is coupled to said first visor panel and another of said brackets is coupled to said second visor panel; and interlocking means for releasably interlocking adjacent edges of said first and second visor panels.

7. The visor assembly as defined in claim 6 wherein said interlocking means comprises a ball mounted to a corner of one of said first and second visor panels and a socket mounted to the other of said first and second visor panels for releasably holding said ball.

8. The visor assembly as defined in claim 6 wherein at least one of said first and second visor panels is slideably mounted for movement along its longitudinal axis.

9. The visor assembly as defined in claim 6 wherein at least one of said first and second visor panels includes an auxiliary slide-out panel.

\* \* \* \* \*